United States Patent
Walter et al.

(10) Patent No.: US 6,342,024 B1
(45) Date of Patent: Jan. 29, 2002

(54) CONTINUOUSLY VARIABLE CONE-PULLEY-BELT TRANSMISSION

(75) Inventors: Bernhard Walter, Oberkirch; Anton Fritzer, Bühl; Rainer Eidloth, Lauf; Carsten Weinhold, Bühl; Franz Bitzer, Landau, all of (DE)

(73) Assignee: LuK Lamellen und Kupplungsbau GmbH, Buhl/Baden (DE)

( * ) Notice: Subject to any disclaimer, the term of this patent is extended or adjusted under 35 U.S.C. 154(b) by 0 days.

(21) Appl. No.: 09/567,494

(22) Filed: May 8, 2000

Related U.S. Application Data

(63) Continuation of application No. PCT/DE98/03301, filed on Nov. 3, 1998.

(30) Foreign Application Priority Data

Nov. 7, 1997 (DE) .......................... 197 49 289

(51) Int. Cl.[7] .......................... F16H 37/02; F16H 47/06; B60K 17/04
(52) U.S. Cl. .......................... 475/210; 474/28
(58) Field of Search .......................... 475/210, 207; 474/18, 19, 28

(56) References Cited

U.S. PATENT DOCUMENTS

| | | | |
|---|---|---|---|
| 3,566,710 A | 3/1971 | Long .......................... 74/443 |
| 4,433,594 A | 2/1984 | Smirl .......................... 475/206 |
| 4,633,736 A | * 1/1987 | Sakakibara et al. ..... 475/210 X |
| 4,708,699 A | 11/1987 | Takano et al. .......................... 474/144 |
| 4,722,718 A | 2/1988 | Eugen .......................... 474/19 |
| 4,760,757 A | 8/1988 | Svab .......................... 475/136 |
| 4,950,213 A | * 8/1990 | Morisawa .......................... 475/206 |
| 5,184,981 A | * 2/1993 | Wittke .......................... 474/19 |
| 5,189,611 A | 2/1993 | Petzold et al. .......................... 701/58 |
| 5,234,073 A | * 8/1993 | Friedmann et al. .......................... 180/292 |
| 5,244,437 A | * 9/1993 | Haley et al. .......................... 474/18 |
| 5,295,915 A | 3/1994 | Freidmann .......................... 474/18 |
| 5,295,920 A | * 3/1994 | Sawasaki et al. .......................... 475/210 |
| 5,470,285 A | 11/1995 | Schneider et al. .......................... 475/210 |
| 5,538,481 A | 7/1996 | Friedmann .......................... 475/142 |
| 5,667,448 A | 9/1997 | Friedmann .......................... 474/18 |
| 5,890,987 A | * 4/1999 | Lamers .......................... 475/210 |

FOREIGN PATENT DOCUMENTS

| | | |
|---|---|---|
| EP | 0 338 219 | 10/1989 |
| FR | 2 348 408 | 11/1977 |
| GB | 2295870 A | * 6/1996 |

* cited by examiner

*Primary Examiner*—Sherry Estremsky
*Assistant Examiner*—Ankur Parekh
(74) *Attorney, Agent, or Firm*—Darby & Darby

(57) ABSTRACT

A continuously variable belt-drive transmission for a motor vehicle with two pairs of conical discs (11, 21) has a compact layout arrangement where the torque flows from a prime mover through an input shaft (2), start-up element (4), torque sensor (10), first conical-disc pair (11), chain-belt (25), second conical-disc pair (21), direction-reversing element (28), and output shaft (3) to the wheels of the vehicle.

32 Claims, 3 Drawing Sheets

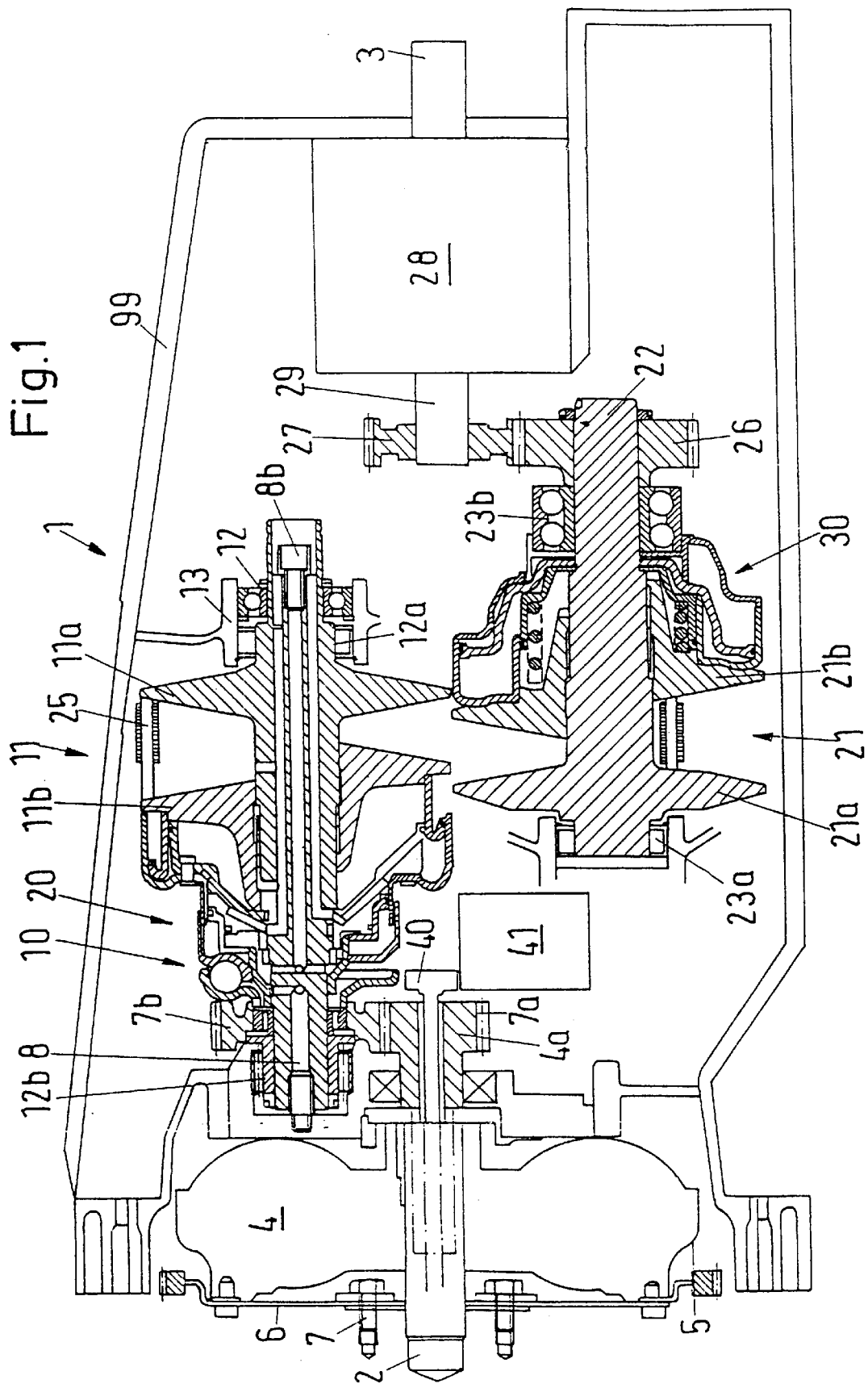

CONTINUOUSLY VARIABLE CONE-PULLEY-BELT TRANSMISSION

This appln is a con of PCT/DE 98/03301 Nov. 3, 1998.

BACKGROUND OF THE INVENTION

The invention relates to a transmission, such as a continuously variable cone-pulley belt transmission that is arranged in the torque flow path of a motor vehicle between a it prime mover unit and at least one wheel and has an input shaft, an output shaft, a start-up element, and a direction-reversing element.

As a rule, transmissions of this kind are very compact in the axial direction, because the two pairs of pulley discs use up only a small amount of axial space. In the radial direction, however, the same transmissions are very large and require a great amount of space.

Transmissions, including continuously variable transmissions such as cone-pulley belt transmissions, e.g., for vehicles with a front-mounted engine and rear-wheel drive, must be designed with a very narrow profile so that they require only a small amount of space, because the drive-shaft tunnel of these vehicles is normally very narrow and constrained. Any space savings made by reducing the cross-sectional profile of the drive-shaft tunnel will be to the benefit of the interior space of the vehicle, which is a particularly desirable advantage.

OBJECT OF THE INVENTION

It is therefore the object of the present invention to provide a transmission that has compact dimensions in the radial direction in relation to the drive shaft and incorporates improvements in design, function, and manufacturing cost.

SUMMARY OF THE INVENTION

The invention meets the foregoing objective in a transmission, such as a continuously variable cone-pulley belt transmission, that is arranged in the torque flow path of a motor vehicle between a prime mover unit and at least one wheel. The transmission has an input shaft, an output shaft, a start-up element, a direction-reversing element, a first pair of conical discs with an axially fixed conical disc and an axially movable conical disc, a second pair of conical discs with an axially fixed conical disc and an axially movable conical disc, an endless flexible chain belt to transmit torque between the first and second cone-disc pairs, a torque sensor, and actuators to effect axial movement of the movable conical discs. According to the invention, the objective stated above is met by the following arrangement of the elements in the torque-flow path, wherein:

- in the sequence of the torque-flow path, the start-up element is arranged at some point after the input shaft, where the input side of the start-up element is connected to the input shaft and the output side of the start-up ico element is coaxial to the input shaft,
- a gear stage is arranged between the output of the start-up element and the torque sensor,
- the torque sensor and the first pair of conical discs are arranged coaxially on a first shaft,
- the second pair of conical discs is arranged on a second shaft that is connected through a gear stage to the direction-reversing element,
- the direction-reversing element is coaxial with the output shaft of the transmission.

Also advantageous is an arrangement of the elements in the torque-flow path, wherein:

- in the sequence of the torque-flow path, the start-up element is arranged at some point after the input shaft, where the input side of the start-up element is connected to the input shaft and the output side of the start-up element is coaxial to the input shaft,
- the torque sensor is arranged in sequence after the output side of the startup element,
- the torque sensor and the first pair of conical discs are arranged coaxially on a first shaft,
- the second pair of conical discs is arranged on a second shaft, with the direction-reversing element being arranged in the torque flow path at a point after the second shaft,
- the direction-reversing element is arranged coaxially in relation to the output shaft of the transmission.

It is further practical if the start-up element and the first pair of conical discs are arranged to be coaxial.

It is likewise advantageous if the start-up element and a shaft of the first cone-disc pair are offset in relation to each other, with torque being transmitted from one to the other by means of a gear stage such as, e.g., a set of spur gears.

Furthermore, it is especially practical if the second pair of conical discs is arranged to be coaxial in relation to the output shaft.

It is likewise beneficial if the second pair of conical discs is offset against the output shaft, with torque being transmitted from one to the other by means of a gear stage.

It is particularly advantageous if in the first cone-disc pair, the axially movable disc is the one nearer to the input shaft.

It can also be advantageous if in the first cone-disc pair, the axially movable disc is the one nearer to the output shaft.

It is practical if in the second cone-disc pair, the axially movable disc is the one nearer to the input shaft.

In another embodiment, it is advantageous if in the second cone-disc pair, the axially movable disc is the one nearer to the output shaft.

In an advantageous embodiment of the invention, it is practical if the shaft of the first pair of conical discs is arranged above the input shaft. In another embodiment, it is practical if the shaft of the first pair of conical discs is arranged below the input shaft.

It is further advantageous, if the shaft of the second cone-disc pair is arranged above the input shaft.

It is likewise practical if the shaft of the second cone-disc pair is arranged below the input shaft. This allows space to be saved.

In an advantageous arrangement, space is saved if the shafts of the first and second pairs of conical discs are arranged to the side of the input shaft, as seen in an axial direction.

Likewise, it is advantageous if the shafts of the first and second pairs of conical discs as well as the input and output shafts lie in one plane.

It is particularly advantageous and space-saving, if the output shaft is arranged to be concentric with the input shaft.

Furthermore, it is particularly advantageous and space-saving, if the output shaft is arranged to be coaxial with the input shaft.

In an embodiment according to the invention, it is practical if the start-up element is a hydrodynamic torque converter with or without a converter-bypass clutch.

In another embodiment, it is practical if the start-up element is a friction clutch such as a dry-running single-disc clutch, or a wet-running laminar-disc clutch. Thus, the friction clutch can be a laminar clutch running in oil with at least one laminar disc. Likewise, the friction clutch can be configured as a dry friction clutch with one or more clutch discs.

It is further practical, if the direction-reversing element, such as a reverse-gear stage, has two clutches and a planetary gear set. In an arrangement of this kind, the clutches can also work, e.g., as brakes that engage a stationary element.

It is advantageous, if the start-up element and the direction-reversing element are configured as one modular unit.

It can further be practical, if the start-up element and the direction-reversing element are configured as one modular unit and are arranged ahead of the first cone-disc pair in the torque flow path.

It is likewise practical if the start-up element and the direction-reversing element are configured as one modular unit and are arranged after the second cone-disc pair in the torque flow path.

It is advantageous, if the axes of rotation of the pairs of conical discs are arranged parallel to each other.

It is likewise advantageous, if the axes of rotation of the input shaft and the output shaft are arranged parallel to each other and to the axis of the crankshaft.

According to a concept of the invention, it is advantageous if the actuator means include two piston/cylinder units for the pressure-actuated position-setting of the axially movable conical discs, with one piston/cylinder unit per cone-disc pair serving to set the transmission ratio and a second piston/cylinder unit per cone-disc pair serving to set the gripping pressure of the discs against the chain-belt.

In another embodiment of the invention, it is practical if the torque sensor within the transmission is omitted.

The invention further relates to a transmission, such as a continuously variable cone-pulley-belt-drive transmission, with the advantageous feature that the transmission has a transmission housing made of a foamed material. According to the invention, this will save weight as well as cost because the weight reduction will lead to lower fuel consumption. In addition to protecting the environment, this also translates into a cost advantage.

It is particularly practical if the transmission is made of foamed metal, e.g., aluminum, magnesium, or another light metal.

In accordance with a further inventive concept, it is also practical in a transmission if the transmission housing has hollow spaces that are at least partially filled with a foamed material.

In the embodiment just described, it is advantageous if the foamed material is aluminum, magnesium, or another light metal.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

The following detailed description of the invention is based on the attached drawing in which FIG. 1 represents a schematic view of the invention, FIG. 1b represents a scaled-up view of a portion of FIG. 1a.

DETAILED DESCRIPTION OF THE INVENTION

Figure 1A:
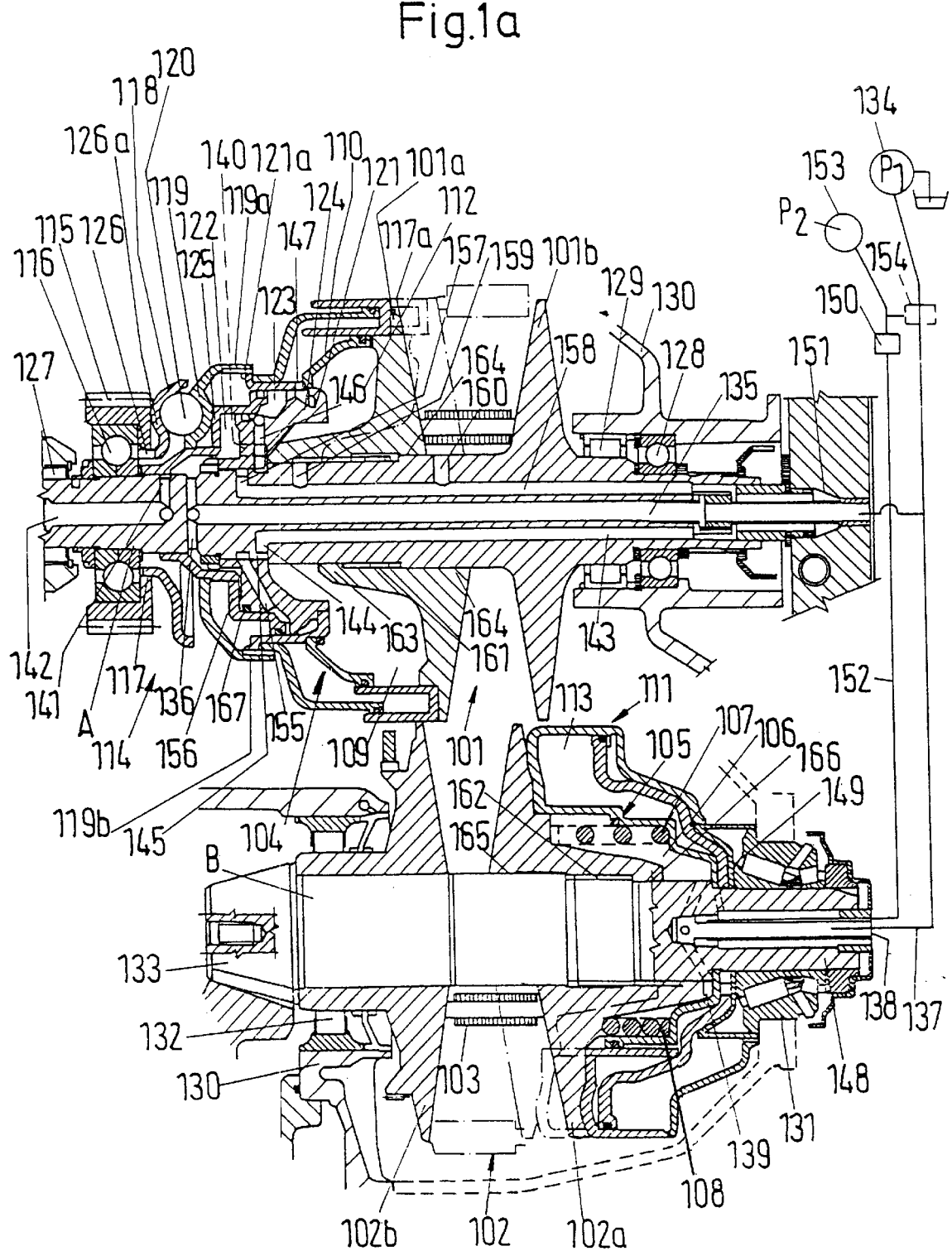
FIG. 1a represents a section through a partially illustrated cone-pulley-belt-drive transmission with a torque sensor according to the invention.

FIG. 1 gives a schematic view of a transmission 1, such as a continuously variable cone-pulley belt transmission that is arranged in the torque flow path of a motor vehicle between a prime mover unit and at least one wheel of the motor vehicle.

The transmission 1 has a housing 99 that is preferably made of a foamed material, preferably aluminum, magnesium or another light metal. Likewise, hollow spaces of the housing 99 can be filled with the foamed material. Also, in a further embodiment, the foamed material can be applied to the housing as a coating. In accordance with the invention, the latter concept has the advantage that oscillations of the housing a being damped, i.e., it works as sound insulation. In accordance with the invention, this produces a heightened level of acoustical comfort inside and/or outside the vehicle while, at the same time, the manufacturing cost is reduced. By using foamed material, such as aluminum or magnesium, the density of the material can be reduced, e.g., by 30% to 60%. In aluminum or magnesium with densities of 2.7 g/cm$^3$ and 1.7 g/cm$^3$, respectively, the foam densities will thus be in the range of 0.5 to 1.0 grams per cubic centimeter.

The transmission 1 has an input shaft 2 that can be connected, e.g., to the crankshaft of a prime mover unit such as a motor or combustion engine. The transmission 1 further has an output shaft 3 that can be connected to an output-torque is transmitting shaft or drive shaft. In the embodiment of FIG. 1, the input shaft 2 is arranged essentially parallel to the output shaft 3. The arrangement of the input shaft 2 is not coaxial with the output shaft 3, but in another embodiment a coaxial arrangement can be advantageous.

A start-up element 4 is arranged in the torque flow path after the input shaft 2. In this embodiment, the start-up element is a hydrodynamic torque converter 5 with or without converter bypass clutch, represented in the drawing by its exterior contour outline. The input shaft 2 is operatively connected to the start-up element 4 by connecting the input shaft 2 to the housing of the torque converter, while the converter is connected to the crankshaft through the flexible membrane 6 and the fastening means 7 in the form of screws.

The start-up element 4 can include a damper for torsional vibrations, such as a wet- or dry-running damper, in certain cases with spring damping units and frictional damping units, as well as in some cases a flywheel or a dual-mass flywheel with means for the damping of torsional vibrations arranged between the elements of the primary mass and the secondary mass that are movable in relation to each other.

As shown schematically in FIG. 1, the start-up element 4 in can be provided in the form of a torque converter with or without converter bypass clutch, where in further embodiments it is also possible to use a dry-running clutch or a wet-running clutch.

The output element 4a of the start-up element 4 is connected to a gear 7a. The tooth profile of gear 7a meshes with the tooth profile of a further gear 7b that is arranged to be rotatable in relation to the shaft 8.

The gear 7b is connected to the shaft 8b on which the torque sensor 10 and the first cone-disc pair 11 are arranged. The torque sensor 10 is arranged in the torque flow path between the shaft 8b and the cone-disc pair 11. The shaft 8b is arranged at an offset position in relation to the input shaft 2.

The first cone-disc pair 11 has an axially fixed conical disc 11a that is either solidly attached to the shaft 8b or made in one piece together with the shaft 8b. In addition, the first cone-disc pair has an axially movable conical disc 11b that is axially movable in relation to the axially fixed conical disc 11a but is non-rotatably constrained on the shaft 8b. The control over the axial positioning of the conical disc 11b occurs by pressurizing the actuator means 20, such as piston/cylinder units.

The shaft 8b of the cone-disc pair 11 is received and supported by means of at least one bearing 12, 12a, 12b, such as an anti-friction bearing, ball bearing, or roller bearing, in a collar 13 of the housing 99, whereby the shaft is being centered in the axial and/or radial direction The second cone-disc pair 21 has an axially fixed conical disc 21a that is either solidly attached to the shaft 22 or made in one piece together with the shaft 22. In addition, the second cone-disc pair 21 has an axially movable conical disc 21b that is axially movable in relation to the axially fixed conical disc 21a but is non-rotatably constrained on the shaft 22. The control over the axial positioning of the conical disc 21b occurs by pressurizing the actuator means 30, such as piston/cylinder units. The shaft 22 of the cone-disc pair 21 is received and supported by means of the bearings 23a, 23b, such as anti-friction bearings, ball bearings, or roller bearings, in collars of the housing 99, whereby the shaft 22 is being centered in the axial and/or radial direction To transmit torque between the first cone-disc pair 11 and the second cone-disc pair 21, a chain-belt 25 is arranged to work between the two pairs of conical discs. The compressive hold on the chain-belt between the discs of each disc pair ensures that a torque is transmitted between the chain-belt and the cone-disc pair. The position-shifting of the axially movable conical discs results in a step-less variation of the transmission ratio.

The shaft 22 of the driven cone-disc pair 21 is connected to a gear 26, where the tooth profile of gear 26 meshes with the tooth profile of a further gear 27 and thereby establishes a torque-transmitting connection. Following the second gear 27 is a direction-reversing element 28 such as a reverse gear stage which, in turn, is followed by the output shaft 3 of the transmission 1 for the purpose of reversing the sense of rotation.

From the shaft 4a, by means of a branch drive through the gear 40, a pump 41 is driven that serves to control and supply pressure for actuators and to lubricate the transmission.

In an embodiment of the invention, it is advantageous if the start-up element 4 is arranged in the torque flow path immediately after the input shaft 2 of the transmission 1, with the input of the start-up element 4 being connected to the input shaft 2 and the output of the start-up element 4 being coaxial with the input shaft 2. It can likewise be practical if a gear stage is arranged between the output of the start-up element and the torque sensor 10. In another embodiment, it can be practical, if the output of the start-up element is connected directly to the torque sensor 10 without an interposed torque-transmitting stage or gear stage. It is further practical if the torque sensor 10 and the first cone-disc pair 11 are arranged coaxially on a shaft 8b. In a further embodiment, it can be practical if the second cone-disc pair 21 is arranged on a further shaft 22, where the latter is connected to a direction-reversing element 28 by way of a gear stage 26, 27. The direction-reversing element is arranged to be coaxial with the output shaft 3 of the transmission 1.

In a further advantageous embodiment, it is practical, if the elements of the transmission follow each other in the torque-flow path as follows:

The start-up element 4 is arranged after the input shaft 2, with the input of the start-up element being connected to the input shaft 2 and the output of the start-up element being arranged coaxially with the input shaft 2.

The torque sensor 10 is arranged to follow after the startup element.

The torque sensor 10 and the first cone-disc pair 11 are arranged coaxially on a shaft 8b.

The second cone-disc pair 21 is arranged on a further shaft 22, the latter being followed by the direction-reversing element 28.

The direction-reversing element 28 is arranged to be coaxial with the output shaft of the transmission 1.

In a further embodiment, it is practical if the start-up element 4 and the first cone-disc pair 11 are arranged to be coaxial. Likewise, in a further embodiment, it is advantageous, if the start-up element 4 and a shaft 8b of the first cone-disc pair 11 are arranged at an offset position in relation to each other and if the torque is transmitted by means of a torque-transmitting stage 7a, 7b such as a gear stage, e.g., with spur gears.

In accordance with a further concept of the invention, it is practical if the second cone-disc set 21 is arranged coaxially with the output shaft 3. It is likewise advantageous, if the second cone-disc pair 21 is arranged at an offset position in relation to the output shaft 3 and the transmission of torque is effected by a torque-transmitting stage 26, 27 such as a gear stage. It is particularly advantageous if in the first cone-disc pair 11, the axially movable disc 11b is the one nearer to the input shaft 2. In another embodiment, it can also be advantageous if in the first cone-disc pair 11, the axially movable disc 11b is the one nearer to the output shaft 3.

In a further embodiment, it is practical if in the second cone-disc pair 21, the axially movable disc 21b is the one nearer to the input shaft 2. In another embodiment, it is advantageous if in the second cone-disc pair 21, the axially movable disc 21b is the one nearer to the output shaft 3. In an advantageous embodiment of the invention, it is practical if the shaft 8b of the first cone-disc pair 11 is arranged above the input shaft 2. In another embodiment, it is practical if the shaft of the first cone-disc pair 11 is arranged below the input shaft 2. It is further advantageous, if the shaft 22 of the second cone-disc pair 21 is arranged above the input shaft 2. It is likewise practical if the shaft 22 of the second cone-disc pair 21 is arranged below the input shaft 2. These inventive configurations allow space to be saved. The advantageous arrangement results in a space savings, if the shafts 8b, 22 of the first and second cone-disc pairs 11, 21 are arranged to the side of the input shaft 2, as seen in an axial direction. Likewise, it is advantageous if the shafts 8b, 22 of the first and second cone-disc pairs 11, 21 as well as the input shaft 2 and the output shaft 3 lie in one plane. In a further embodiment, it is particularly advantageous and space-saving, if the output shaft 3 is arranged to be concentric with the input shaft 2. It is further especially advantageous space-saving, if the output shaft 3 is arranged to be coaxial with the input shaft 2.

Figure 1B:
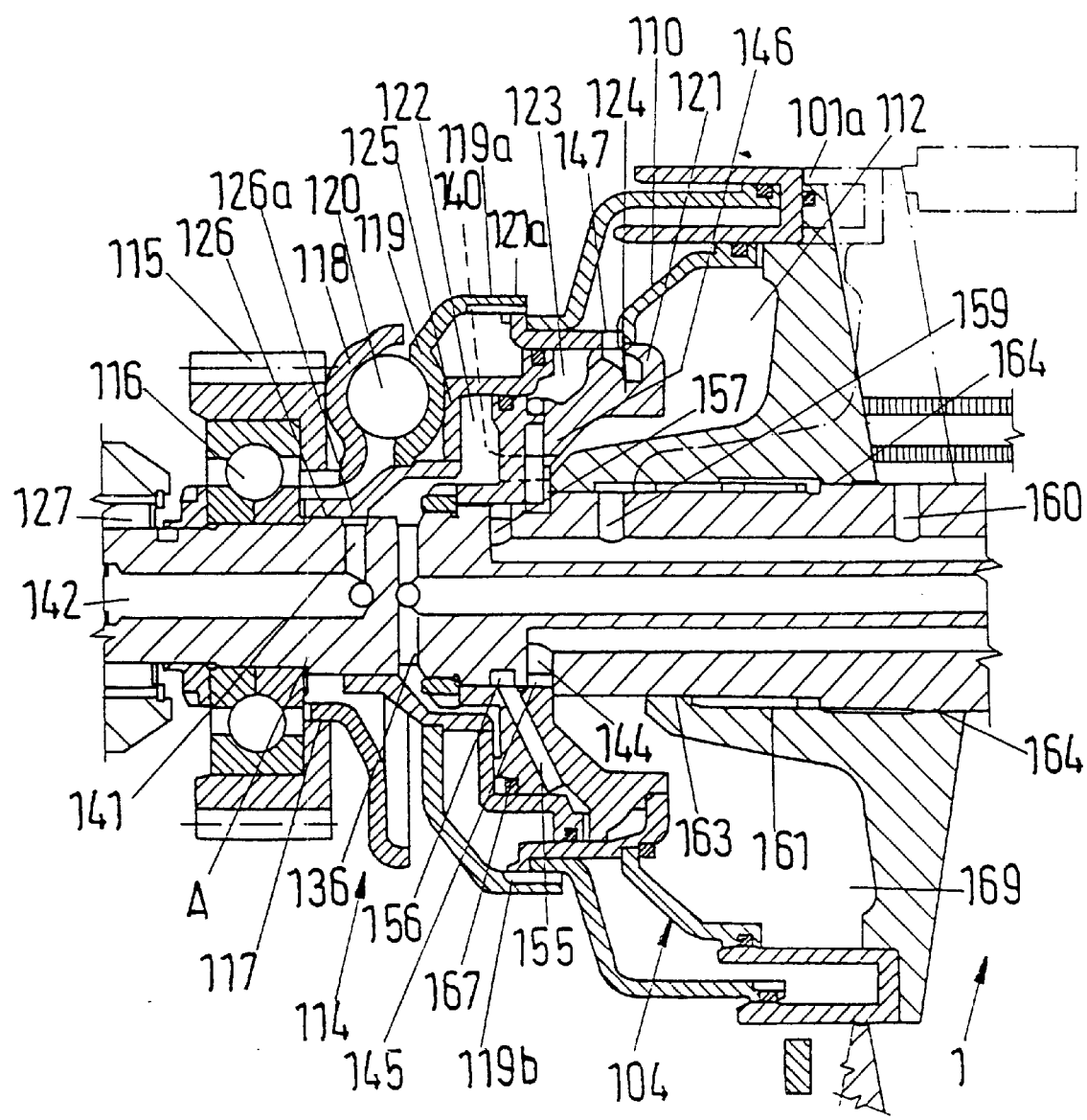

The design version of a continuously variable cone-pulley transmission as shown in portions in FIGS. 1, 1a and 1b has a disc pair or disc set 101 arranged to be rotationally constrained to the driving shaft A and a disc pair 102 arranged to be rotationally constrained to the driven shaft B.

Each disc pair has an axially movable disc element such as the conical discs 101a, 102a and an axially fixed disc element such as the conical discs 101b, 102b. An endless flexible torque-transmitting device in the form of a chain or belt 103 is provided for transmitting torque between the two disc pairs.

In the upper half of each of the disc pairs 101, 102, the discs 101a, 101b, 102a, 102b are shown in axial positions relative to each other that correspond to the slowest possible transmission ratio (underdrive), while in the lower half of the same representations, the relative positions of the discs 101a, 101b, 102a, 102b correspond to the fastest possible transmission ratio (overdrive).

The disc pair 101 can be axially tightened by means of an actuator such as the actuating means 104 in the form of a piston/cylinder unit. Similarly, the disc pair 102 can be tightened against the chain 103 by means of an actuator such as the actuating means 105 that is likewise configured as a piston/cylinder unit. Inside the pressure chamber 6 of the piston/cylinder unit 105, an energy-storing element 107 in the form of a coil spring is provided for the function of urging the axially movable disc element 102a in the direction towards the axially fixed disc element 102b. When the chain 103 is running in an inner radial range of the disc pair 102, the tightening force applied by the energy-storing element 107 is larger than when the chain 103 is running in the outer radial range of the disc pair 102. In other words, as the transmission ratio is increased in the sense of greater vehicle speed, the tightening force supplied by the energy-storing element is also increased. The coil spring 107 pushes at one end directly against the axially movable disc element 102a and is seated at the other end in a cup-shaped component 108 that delimits the pressure chamber 106 and is rigidly connected to the driven shaft B.

The further piston/cylinder units 110, 111, which are arranged to act in parallel with the piston/cylinder units 104 and 105, respectively, serve the function of changing the transmission ratio. The desired transmission ratio is set by pressurizing one of the pressure chambers 112, 113 of the piston/cylinder units 110, 111 while draining the other of the pressure chambers 112, 113, or vice versa. This is accomplished by connecting the pressure chambers 112, 113 either to a source of pressure medium, such as a pump, or to a drain conduit, according to the momentary requirements. Thus, when the transmission ratio is being changed, one of the pressure chambers 112, 113 is being supplied with pressure fluid whereby the chamber volume is increased, while the other of the pressure chambers 112, 113 is at least partially drained of pressure fluid whereby its chamber volume is decreased. The simultaneous pressurizing of one and draining of the other of the chambers 112, 113 can be performed through an appropriate valve. The design and function of a suitable valve are covered in the previously cited state of the art.

A torque sensor 114 based on a hydro-mechanical principle is provided to generate a pressure that is a function of at least the magnitude of the torque. The torque sensor 114 transmits the torque received from the driving gear or pinion 115 to the cone-disc pair 101. The drive gear 115 is supported through an anti-friction bearing 116 on the driving shaft A and rotationally constrained to the ramp disc 118 of the torque sensor 114 through a form-locking connection or tooth profile 117, with the ramp disc 118 also being seated axially against the drive gear 115. In addition to the axially fixed ramp disc 118, the torque sensor 114 includes an axially movable ramp disc 119. Space-holding bodies in the form of balls 120 are provided between the ramp on the disc 118 and the ramp on the disc 119. The ramp disc 119 is axially movable on the driving shaft A, but constrained to share its rotation. For this purpose, the ramp disc 119, on the side facing away from the balls 120, has a radially outer portion 119a carrying a tooth profile 119b meshing with a corresponding tooth profile 121a of a component 121 that is axially as well as rotationally fixed on the driving shaft A. In this arrangement, the tooth profile 119b and the corresponding tooth profile 121a have shapes that cooperate with each other to allow an axial displacement between the components 119 and 121.

The components of the torque sensor 114 delimit two pressure compartments 122, 123. The pressure compartment 122 is enclosed by a ring-shaped component 124 that is rigidly connected to the driving shaft A as well as by portions or components 125, 126 that are formed or supported by the ramp disc 119. The ring-shaped pressure chamber 123 is located essentially outwards of the ring-shaped pressure compartment 122 in the radial direction, but offset in the axial direction. The second pressure chamber 123 is delimited likewise by the ring-shaped component 124 as well as the sleeve-like component 121 that is solidly connected to the component 124, and further by the ring-shaped component 125, which is solidly connected to the ramp disc 119, axially movable and functioning as a piston.

The driving shaft A, which supports the torque sensor 114 and the cone-disc pair 101, is supported in a housing 130 through a needle bearing 127 on the torque-sensor side and through a ball bearing 128 and roller bearing 129 on the far side of the cone-disc pair 101 in relation to the torque sensor, with the ball bearing 128 taking up axial forces and the roller bearing 129 taking up radial forces. The driven shaft B, which supports the driven cone-disc pair 102, is supported in the housing 130 through a dual-taper roller bearing 131 located at the end next to the actuating members 105 and 111 and taking up radial forces as well as axial forces in both directions, and through a roller bearing 132 on the far side of the cone-disc pair 102 in relation to the actuating members 105 and 111. The driven shaft B carries, e.g., a bevel gear 133 that is in operative connection, for example with a differential, at the far end from the actuating members 105 and 111.

A pump 134 serves to generate the pressure that is modulated by the torque sensor 114 as required for tensioning the grip of the cone-pulley-belt-drive transmission. The pump 134 is connected to the pressure compartment 122 of the torque sensor 114 through a central channel 135 running through the driving shaft A and terminating in at least one radial channel 136. The pump 134 is further connected through a conduit 137 to the pressure chamber 106 of the piston/cylinder unit 105 of the second cone-disc pair 102. The conduit 137 connects to a central channel 138 of the driven shaft B which, in turn, is connected to the pressure chamber 106 through at least one radially oriented channel 139.

The pressure compartment 122 of the torque sensor 114 is connected to the pressure chamber 109 of the piston/cylinder unit 104 by way of the channel 140 which is indicated by a broken line because it is offset in the circumferential direction from the section plane of FIG. 1a. The channel 140 runs through the ring-shaped component 124 that is rigidly connected to the shaft A. Thus, the channel 140 always connects the first pressure compartment 122 to the pressure chamber 109. The driving shaft A further contains at least one drain channel 141 that is connected or connectable to the pressure compartment 122, where the drain cross-section of the channel 141 is variable in function of at least the amount of torque to be transmitted. The drain channel 141 connects to a central bore hole 142 of the shaft A which, in turn, can be connected to a conduit through which the oil drained from the torque sensor 114 can be sent to appropriate locations, e.g., for the lubrication of components. The axially movable ramp disc or cam disc 119, which is supported with axial mobility on the driving shaft A, has an inner portion 126a cooperating with the drain channel 141 to form a shutter by which the drain channel 141 can be closed off to a larger or smaller extent in function of at least the amount of torque that is present at any given time. Thus, the shutter portion 126a in combination with the drain channel 141 forms a valve or throttle. In function of at least the amount of torque acting between the discs 118 and 119, the drain opening or channel 141 is opened or closed to a corresponding extent, whereby the pressure supplied by the pump 134 is regulated at least in the pressure compartment 122 to a pressure level corresponding at least to the amount of torque present at the given point in time. As the pressure compartment 122 is connected to the pressure chamber 109 and, by way of the channels or conduits 135, 136, 137, 138 and 139, also communicates with the pressure chamber 106, a corresponding level of pressure is also generated in the pressure chambers 109 and 106.

Because the piston/cylinder units 104, 105 are arranged to act in parallel with the piston/cylinder units 110, 111, the forces generated by the pressure delivered from torque sensor 114 and acting against the axially movable discs 101a, 102a are added to the forces against the discs 101a, 102a produced by the pressure in the chambers 112, 113 for setting the transmission ratio.

The pressure chamber 112 is supplied with pressure medium by way of a channel 143 running through the shaft A and connecting through a radial bore 144 to a ring groove 145. From the ring groove 145, at least one channel 146 leads through the ring-shaped component 124 and connects to the radial passage 147 running through the sleeve-shaped component 121 into the pressure chamber 112. The pressure chamber 113 is supplied with oil in a similar manner by way of a channel 148 surrounding channel 138 and communicating through radially directed connector channels 149 with the pressure chamber 113. The channels 143 and 148 are supplied from a common pressure source by way of conduits 151 and 152 with at least one interposed valve 150. The pressure source 153 connected to the valve or valve system 150 can be configured as a separate pump or provided by the existing pump 134, with the latter arrangement requiring an appropriate volume- or pressure-distributing system 154 which can include several valves. The latter alternative is represented by broken lines in the drawing.

With the components positioned in relation to each other as shown in the upper half of the representation of the cone-disc pair 101, the pressure compartment 123, which is pressurized in parallel with the pressure compartment 122, is disconnected from a pressure supply because the channels or bores 155, 156, 157, 158, 159, 160 leading to the pressure compartment 123 are not connected to a source of pressure medium as, in particular, the pump 134. The axially movable disc 101a is in a position where the radial bore 160 is fully open, so that the compartment 123 is totally relieved of pressure. The is axial force acting against the cam disc or ramp disc 119 as a result of the torque to be transmitted is taken up only by the pressure cushion that builds up in the pressure compartment 122. The larger the amount of torque to be transmitted, the higher will be the pressure level in the compartment 122. As already mentioned, this pressure level is controlled by the portions 126a and the drain bore 141 cooperating as a throttle valve.

With a change in transmission ratio to a faster speed, the conical disc 101a is shifted towards the right, i.e., in the direction of the conical disc 101b. This has the effect on the cone-disc pair 102 that the conical disc 102a moves away from the axially fixed disc 102b. As previously mentioned, in the upper half of each of the disc pairs 101, 102, the discs 101a, 101b, 102a, 102b are shown in axial positions relative to each other that correspond to the slowest possible transmission ratio, while in the lower half of the same representations, the relative positions of the discs 101a, 101b, 102a, 102b correspond to the fastest possible transmission ratio.

To shift from the transmission ratio corresponding to the upper halves of the representations of the cone-disc pairs 101, 102 to the ratio corresponding to the respective lower halves, the pressure chamber 112 is appropriately filled while the pressure chamber 113 is drained or reduced in volume under the control of the valve 150.

Each of the axially movable conical discs 101a, 102a is non-rotatably coupled to its shaft A, B by way of a tooth-profiled connection 161, 162, respectively. The non-rotatable connections 161, 162 established through internal tooth profiles on the discs 101a, 102a and external tooth profiles on the shafts A and B allow the discs 101a, 102a to shift their axial positions on the respective shafts A, B.

The respective positions of the axially movable disc 101a and chain 103 as shown in dash-dotted lines in the upper half of the representation of the driving cone-disc pair 101 correspond to the fastest possible transmission ratio. When the chain 103 is in the position shown in dash-dotted lines at the cone-disc pair 101, it will take up the position shown in full lines at the cone-disc pair 102.

The respective positions of the axially movable disc 102a and chain 103 as shown in dash-dotted lines in the lower half of the representation of the driven cone-disc pair 102 correspond to the slowest possible transmission ratio. When the chain 103 is in the position shown in dash-dotted lines at the cone-disc pair 102, it will take up the position shown in full lines at the cone-disc pair 101.

In the illustrated embodiment, the discs 101a, 102a at interior radial locations have centering portions 163, 164 and 165, 166 by which they are directly seated and centered on their respective shafts A and B. The guide portions 163, 164 of the axially movable disc 101a, which are received with virtually no play on the circumference of the shaft A, cooperate with the channels 159 and 160 to function as valves, with the disc 101a functioning in effect as a valve gate in regard to the channels 159, 160. With a rightward displacement of the disc 101a from the position shown in the upper half of the representation of the cone-disc pair 101, the channel 160 after a certain amount of travel of the disc 101a will be gradually shut off by the guide portion 164 with further axial displacement of the disc 101a. In other words, the guide portion 164 will move to a position radially above the channel 160. In the same position, the channel 159, too, is shut to the outside by the conical disc 1a, more specifically by the guide portion 163. With continuing axial displacement of the disc 101a in the direction of disc 101b, the channel 160 remains shut, while the channel 159 is gradually opened up by the disc 101a or, more precisely, by its control or guide portion 163. A connection is thereby opened between the pressure chamber 109 of the piston/cylinder unit 104 and the channel 158 by way of the channel 159 whereby, in turn, a connection is established through the channels 157, 156 and 155 to the pressure compartment 123. Because at this point the channel 160 is practically closed off and a connection exists between the pressure chamber 109 and the two pressure compartments 122 and 123, the pressure level will be practically equalized between the two pressure compartments 122, 123 and the pressure chamber 109, and thus also in the chamber 106 that is operatively connected to the two pressure compartments 122, 123 and the pressure chamber 109 through the channel 135 and the conduits 137, 138, except for small pressure losses that may occur in the pressure-transmission paths. Because of the transmission-ratio-dependent connection between the two pressure compartments 122 and 123, the effective axially oriented surface of the pressure fluid cushion in the torque sensor 114 has been increased, because the effect of the axially directed surfaces of the two pressure compartments 122, 123 is additive. The increase of the axially effective cushion surface has the effect that the pressure built up by the torque sensor in relation to a given amount of torque is decreased essentially in proportion to the increase in surface, which means that the pressure is also reduced commensurately in the pressure chambers 109 and 106. As a result, the torque sensor 114 according to the invention allows a ratio-dependent pressure modulation to be superimposed on the torque-dependent pressure modulation. The torque sensor 114 as shown allows a two-step modulation of the pressure level.

In the illustrated embodiment, the channels 159, 160 are arranged and configured in relation to each other and in relation to the associated portions 163, 164 of the disc 101a so that the switch-over from the single pressure compartment 122 to the combination of both pressure compartments 122, 123 and vice versa occurs at a transmission ratio of approximately 1:1. However, as previously mentioned, the switch-over cannot occur instantaneously for practical design reasons, so that there is a transition range where on the one hand the drain channel is already shut but the connector channel is not yet connected to the pressure chamber 109. In order to allow the transmission and specifically the torque sensor 114 to function in the transition range, which requires a means for axially displacing the ramp disc 119, compensation means are provided to allow a volume change of the pressure compartment 123, so that the torque sensor 114 remains able to pump fluid, which means that the cylinder components and the piston components of the torque sensor 114 are able to move in relation to each other. The compensation means in the illustrated embodiment are configured as a tongue seal or lip seal 167 that is seated in a radial grove of the ring-shaped component 124 and cooperates with the inner cylinder wall of the component 125 to seal the two pressure compartments 122, 123 against each other. The seal ring 167 is configured and arranged in such a manner that it blocks the passage of fluid and equalization of pressure between the chambers 122 and 123 only in one axial direction while allowing the passage and equalization of pressure in the other direction at least in the presence of a positive pressure differential between the pressure compartments 123 and 122. Thus, the seal ring 167 works similar to a check valve that blocks the fluid flow from the pressure compartment 122 to the pressure compartment 123, but allows the passage between adjoining seal parts at seal ring 167 when there is a certain amount of excess pressure in compartment 123 in relation to compartment 122. As a result, when the ramp disc 119 is moved in a rightward direction, pressure fluid can flow from the enclosed pressure compartment 123 to the pressure compartment 122. With a subsequent leftward displacement of the ramp disc 119, it is possible that a condition of underpressure, possibly even accompanied by the formation of air bubbles in the oil, will occur in the pressure compartment 123. However, this is not harmful to the function of the torque sensor nor of the transmission as a whole.

In place of the seal 167 working in the manner of a check valve, it is also possible to provide a check valve acting between the two pressure compartments 122, 123, which would be installed in the ring-shaped component 124. In this case, one could use a seal 167 that works in both axial directions. Furthermore, a check valve of this kind could also be arranged is to work between the two channels 135 and 158. In this case, the check valve has to be arranged to allow the passage of fluid in the direction from pressure compartment 123 to pressure compartment 122 while blocking the passage in the opposite direction.

From the preceding functional description, it can be concluded that practically in the entire speed-reducing part of the transmission range (underdrive), the axial force generated at the ball ramps of the discs 118, 119 acts only against the effective axially directed working surface of the pressure compartment 122, while practically in the entire speed-magnifying part of the transmission range (overdrive), the axial force generated at the ball ramps of the discs 118, 119 is opposed by the combination of the effective axially directed working surfaces of both pressure compartments 122 and 123. Thus, with an equal amount of input torque, the pressure generated by the torque sensor 114 is higher when the transmission is in a speed-reducing mode than when it is in a speed-magnifying mode. As previously mentioned, the transmission as illustrated is designed so that the switch-over point between the connected and separated states of the pressure compartments 122, 123 lies in the area where the transmission ratio is about 1:1. However, the location of the switch-over point or switch-over range within the overall transmission range can also be set differently through another arrangement and configuration of the channels 159, 160 and the respective cooperating portions 163, 164 of the conical disc 101a.

The connection or separation of the pressure compartments 122, 123 can also be effected by a valve provided specifically for this purpose, which can be arranged in a channel connecting the two pressure compartments 122, 123. The valve does not necessarily have to be actuated directly by means of disc 101a or 102a; it could also be actuated by an external energy source. One could use for this purpose, e.g., an electro-magnetically, hydraulically or pneumatically actuated valve that is switched depending on the transmission ratio or depending on a change in transmission ratio. For example, one could use a so-called 3/2 valve to effect the connection or separation of the two pressure compartments 122, 123. Another possibility is to use pressure valves. An appropriate valve could be provided in a conduit connecting the two channels 135 and 158, in which case the two channels 159 and 160 are closed off or omitted from the design. The valve used in this place is connected so that it relieves the compartment 123 of pressure when the pressure compartments 122, 123 are separated. To perform this function, the valve can be connected to a conduit leading back to the oil sump.

If an externally controlled valve is used, this offers the possibility that the valve can also be actuated in function of additional parameters. As an example, the valve could also be actuated in response to sudden peaks in the torque transmitted through the drive train, whereby slippage of the chain belt can be avoided or reduced at least in certain states of operation or ranges of the transmission ratio.

In the design configuration as shown in FIGS 1a and 1b, the torque sensor 114 is arranged on the drive input side adjacent to the axially movable conical disc 101a. However, with appropriate adaptations, the torque sensor 114 can be arranged at any point in the torque flow path. For example, as is known per se, a torque sensor 114 can also be arranged on the drive output side, e.g., on the driven shaft B. In this case, the torque sensor can be adjacent to the axially movable conical disc 102*a*, analogous to the torque sensor 114 of the illustrated embodiment. As another possibility that is known per se, one could use more than one torque sensor. Thus, for example, appropriate torque sensors could be arranged at both the drive input side and the drive output side.

The torque sensor 114 with at least two pressure compartments 122, 123 according to the invention can further be combined with other measures, which are known per se, for modulating a pressure as a function of torque and/or transmission ratio. For example, the rolling bodies 120 could be displaceable in the radial direction along their associated ramps or tracks, similar to the description in DE-OS 42 34 294, as a function of a transmission-ratio change.

In the embodiment according to FIG. 1*a*, the pressure chamber 106 is connected to the torque sensor 114. However, the pressure generated by the torque sensor 114 can also be introduced into the outer pressure chamber 113, in which case the inner pressure chamber 106 serves the function of varying the transmission ratio. This requires only that the connections of the two conduits 152 and 137 at the second cone-disc pair 102 be mutually interchanged.

In the embodiment illustrated in FIG. 1*a*, the constituent parts of the torque sensor 114 are to a great extent made of sheet metal. The ramp discs 118 and 119, in particular, can be made as sheet-metal stampings, e.g., by press-forming.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A continuously variable cone-pulley belt transmission operating in a torque-flow path of a motor vehicle between a prime mover unit and at least one wheel, comprising an input shaft, an output shaft, a torque sensor with an input portion and an output portion, a start-up element with an input and an output, a direction-reversing element, first and second shafts, first and second pairs of conical discs, each pair having an axially movable conical disc, an endless flexible chain belt to transmit torque between the first pair of conical discs and the second pair of conical discs, and actuators to effect axial movement of the movable conical discs, wherein:

the start-up element is arranged in the torque-flow path after the input shaft, the input of the start-up element is connected to the input shaft, and the output of the start-up element is coaxial with the input shaft, the torque sensor is arranged in the torque-flow path after the output of the startup element, the torque sensor with its input and output portions and the first pair of conical discs are arranged coaxially on the first shaft, the second pair of conical discs is arranged on the second shaft, the direction-reversing element is arranged in the torque-flow path after the second pair of conical discs, the direction-reversing element is arranged to be coaxial with the output shaft of the transmission, wherein the output shaft is arranged to be concentric with the input shaft.

2. The transmission of claim 1, further comprising first and second gear stages, wherein the first gear stage is arranged between the output of the start-up element and the torque sensor, and the second gear stage connects the second shaft to the direction-reversing element.

3. The transmission of claim 1, wherein the start-up element and the first pair of conical discs are coaxial to each other.

4. The transmission of claim 2, wherein the start-up element and the first shaft are offset in relation to each other and torque is transmitted from the start-up element to the first shaft by means of the first gear stage.

5. The transmission of claim 1, wherein the second pair of conical discs is coaxial to the output shaft.

6. The transmission of claim 2, wherein the second pair of conical discs is offset against the output shaft and torque is transmitted from the second pair of conical discs to the output shaft by means of the second gear stage.

7. The transmission of claim 1, wherein the axially movable disc of the first pair is the disc nearer to the input shaft.

8. The transmission of claim 1, wherein the axially movable disc of the first pair is the disc nearer to the output shaft.

9. The transmission of claim 1, wherein the axially movable disc of the second pair of the disc nearer to the input shaft.

10. The transmission of claim 1, wherein the axially movable disc of the second pair is the disc nearer to the output shaft.

11. The transmission of claim 1, wherein the first shaft is arranged above the input shaft.

12. The transmission of claim 1, wherein the first shaft is arranged below the input shaft.

13. The transmission of claim 1, wherein the second shaft is arranged above the input shaft.

14. The transmission of claim 1, wherein the second shaft is arranged below the input shaft.

15. The transmission of claim 1, wherein the first shaft and the second shaft are arranged to the side of the input shaft, as seen in an axial direction.

16. The transmission of claim 1, wherein the first shaft, the second shaft, the input shaft, and the output shaft all lie in one plane.

17. The transmission of claim 1, wherein the start-up element is a hydrodynamic torque converter.

18. The transmission of claim 1, wherein the start-up element is a friction clutch.

19. The transmission of claim 1, wherein the direction-reversing element is a reverse-gear stage with two clutches and a planetary gear set.

20. A continuously variable cone-pulley belt transmission operating in a torque-flow path of a motor vehicle between a prime mover unit and at least one wheel, comprising an input shaft, an output shaft, a torque sensor with an input portion and an output portion, a start-up element, a direction-reversing element, first and second gear stages, first and second shafts, first and second pairs of conical discs, each pair having an axially fixed conical disc and an axially movable conical disc, an endless flexible chain belt to transmit torque between the first pair of conical discs and the second pair of conical discs, and actuators to effect axial movement of the movable conical discs, wherein:

the start-up element and the direction-reversing element are combined in one modular unit with an input and an output, the modular unit is arranged in the torque-flow path after the input shaft, the input is connected to the input shaft, and the output is coaxial to the input shaft, the first gear stage is arranged between the modular unit and the torque sensor, the torque sensor with its input and output portions and the first pair of conical discs are arranged coaxially on the first shaft, the second pair of conical discs is arranged on the second shaft, the second gear stage is arranged in the torque-flow path after the second pair of conical discs, and the output shaft is arranged in the torque-flow path after the second gear stage, wherein the modular unit is arranged in the torque flow path ahead of the first pair of conical discs.

21. A continuously variable cone-pulley belt transmission operating in a torque-flow path of a motor vehicle between a prime mover unit and at least one wheel, comprising an input shaft, an output shaft, a torque sensor with an input portion and an output portion, a start-up element, a direction-reversing element, a gear stage, first and second shafts, first and second pairs of conical discs, each pair having an axially fixed conical disc and an axially movable conical disc, an endless flexible chain belt to transmit torque between the first pair of conical discs and the second pair of conical discs, and actuators to effect axial movement of the movable conical discs, wherein:

the gear stage is arranged in the torque-flow path between the input shaft and the torque sensor, the torque sensor with its input and output portions and the first pair of conical discs are arranged coaxially on the first shaft, the second pair of conical discs is arranged on the second shaft, the start-up element and the direction-reversing element are combined in one modular unit that is arranged in the torque-flow path after the second pair of conical discs.

22. The transmission of claim 1, wherein the first pair of conical discs has a first axis of rotation and the second pair of conical discs has a second axis of rotation, and wherein further the first and second axes of rotation are parallel to each other.

23. The transmission of claim 22, wherein the prime mover unit is a combustion engine with a crankshaft rotating about a crankshaft axis, and wherein further the first and second axes of rotation are parallel to the crankshaft axis.

24. A continuously variable cone-pulley belt transmission operating in a torque-flow path of a motor vehicle between a prime mover unit and at least one wheel, comprising an input shaft, an output shaft, a torque sensor with an input portion and an output portion, a start-up element with an input and an output, a direction-reversing element, first and second shafts, first and second pairs of conical discs, each pair having an axially movable conical disc, an endless flexible chain belt to transmit torque between the first pair of conical discs and the second pair of conical discs, and actuators to effect axial movement of the movable conical discs, the transmission having first and second gear stages, wherein:

the start-up element is arranged in the torque-flow path after the input shaft, the input of the start-up element is connected to the input shaft, and the output of the start-up element is coaxial with the input shaft, the torque sensor is arranged in the torque-flow path after the output of the startup element, the torque sensor with its input and output portions and the first pair of conical discs are arranged coaxially on the first shaft, the second pair of conical discs is arranged on the second shaft, the direction-reversing element is arranged in the torque-flow path after the second pair of conical discs, the direction-reversing element is arranged to be coaxial with the output shaft of the transmission, the first gear stage is arranged at a point in the torque flow path between the input shaft and the first shaft, and the second gear stage is arranged at a point in the torque flow path between the second shaft and the at least one wheel, wherein the first and second gear stages are first and second bevel gear stages.

25. The transmission of claim 24, wherein each of the first and second bevel gear stages has an input sense of rotation and an output sense of rotation, and wherein further the output sense of rotation of the second bevel gear stage is the same as the input sense of rotation of the first bevel gear stage.

26. The transmission of claim 1, wherein the actuators comprise first piston/cylinder units to set a transmission ratio and the second piston/cylinder units to generate a gripping pressure of the conical discs against the chain belt, each of the movable conical discs comprising both a first piston/cylinder unit and a second piston/cylinder unit.

27. The transmission of claim 1, wherein the transmission has a transmission housing made of a foam material.

28. The transmission of claim 27, wherein the foam material is a foamed light metal.

29. The transmission of claim 28, wherein the foamed light metal is one of the metals aluminum and magnesium.

30. The transmission of claim 1, wherein the transmission has a transmission housing comprising hollow spaces at least partially filled with a foam material.

31. The transmission of claim 30, wherein the foam material is a foamed light metal.

32. The transmission of claim 31, wherein the foamed light metal is one of the metals aluminum and magnesium.

* * * * *